(12) United States Patent
Kreter et al.

(10) Patent No.: US 12,342,829 B2
(45) Date of Patent: Jul. 1, 2025

(54) SNACK FOOD PRODUCT AND METHOD OF MAKING THE SAME

(71) Applicant: Frito-Lay North America, Inc., Plano, TX (US)

(72) Inventors: Kevin Kreter, Plano, TX (US); Robert Egnatchik, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

(21) Appl. No.: 17/665,541

(22) Filed: Feb. 6, 2022

(65) Prior Publication Data

US 2023/0248006 A1 Aug. 10, 2023

(51) Int. Cl.
*A21D 13/24* (2017.01)
*A21D 6/00* (2025.01)
*A21D 8/02* (2006.01)
*A21D 13/40* (2017.01)

(52) U.S. Cl.
CPC ............... *A21D 13/24* (2017.01); *A21D 6/00* (2013.01); *A21D 8/02* (2013.01); *A21D 13/40* (2017.01)

(58) Field of Classification Search
CPC .......... A21D 13/24; A21D 13/40; A21D 6/00; A21D 8/02
See application file for complete search history.

(56) References Cited

U.S. PATENT DOCUMENTS

| | | |
|---|---|---|
| 2,178,431 A | 10/1939 | Orr |
| 3,799,724 A | 3/1974 | Grady |
| 4,759,939 A | 7/1988 | Keller et al. |
| 4,880,653 A | 11/1989 | Keller et al. |
| 5,238,693 A | 8/1993 | Walsh |
| 5,536,162 A | 7/1996 | Juranovic et al. |
| D375,396 S | 11/1996 | Wilson et al. |
| 6,254,917 B1 | 7/2001 | Juranovic et al. |
| D565,276 S | 4/2008 | Butt |
| D588,329 S | 3/2009 | Phelan |
| D589,229 S | 3/2009 | Yogev |
| D648,097 S | 11/2011 | Wilson et al. |
| 9,402,401 B1 | 8/2016 | Benzel |
| 10,820,598 B2 | 11/2020 | Bernhardt |
| 2002/0041918 A1 | 4/2002 | Cornwell et al. |
| 2006/0134285 A1 | 6/2006 | Schnieber et al. |
| 2006/0198936 A1 | 9/2006 | Manirath et al. |

(Continued)

FOREIGN PATENT DOCUMENTS

JP 2006109767 4/2006

OTHER PUBLICATIONS

"Thickness" https://www.oxfordlearnersdictionaries.com/us/definition/english/thickness Retrieved Dec. 13, 2023 (Year: 2023).*

(Continued)

*Primary Examiner* — Katherine D Leblanc
(74) *Attorney, Agent, or Firm* — Barnes & Thornburg LLP; G. Peter Nichols (57) ABSTRACT

A shaped snack product having a substantially uniform thickness and an exposed surface area that is capable of receiving seasoning. Processes for making a shaped snack product include forming a shaped dough piece followed by intermediary steps that allow for slicing of the subsequently formed baked shaped piece producing at least two sliced pieces.

10 Claims, 5 Drawing Sheets
(4 of 5 Drawing Sheet(s) Filed in Color)

(56) References Cited

U.S. PATENT DOCUMENTS

2009/0017169 A1   1/2009  Assaad et al.
2009/0017170 A1   1/2009  Armstrong et al.
2019/0307135 A1  10/2019  Gottenbusch et al.

OTHER PUBLICATIONS

Database GNPD [Online] Mintel; Anonymous "Mediterrean Flavoured Bruschette," Nov. 12, 2021.
International Preliminary Report on Patentability issued on Aug. 6, 2024, in PCT/US2023/010778.

* cited by examiner

SNACK FOOD PRODUCT AND METHOD OF MAKING THE SAME

The present disclosure relates generally to shaped snack products and methods to make the snack products. More specifically, the present disclosure relates to a product that is capable of receiving and retaining applied seasoning and to methods for making such a product.

BACKGROUND

Shaped snack products such as pretzels are popular snack items that come in a variety of shapes and sizes such as the traditional twisted (knot-shaped or Bavarian) pretzel shape. Pretzels may be crunchy or soft and may be used to consume different flavored dips. Common features of a crunchy pretzel include a hard outer shell that surrounds a dried breaded inner core. The outer shell may be salted or unsalted. Other products include broken pieces of pretzel ("bits and pieces") that are jagged and uneven and may include a portion of an outer shell.

SUMMARY

The following disclosure describes processes for making shaped snacks. In some embodiments, the method includes extruding dough into a shaped dough piece having a substantially uniform thickness. The shaped dough pieces may be pre-treated, for example but not limited to, contact with a caustic bath solution to form a pre-treated piece. The pre-treated piece is baked to form a baked piece encapsulated by an outer shell. The baked piece may have a moisture content from about 16 weight % to about 21 weight %. After baking, the baked piece is sliced to form an intermediate piece. Each intermediate piece may have a thickness less than the substantially uniform thickness. After slicing, the intermediate pieces may be dried to form shaped snacks. The shaped snacks may be dried to a moisture content of about 0.5% to about 3.5%. In some embodiments, seasoning may be added to the shaped snacks, for example, after drying.

In some embodiments, an outer shell is formed by first exposing the shaped dough piece to a caustic bath and then baking the dough piece to form a baked piece. As the baked piece is conveyed to the slicer, an outer shell may have formed. In some embodiments, the outer shell may be formed by par-cooking the shaped dough piece and then baking.

The sliced shaped snack piece may include a first portion defined by an outer shell and a second portion defined by an exposed surface. In some embodiments, the exposed surface and outer shell receive and retain a seasoning.

In some embodiments, a process for generating shaped dough pieces includes pretreating the shaped dough pieces and baking to a target moisture content that enables slicing to generate substantially uniform pieces to be finished in a kiln or other means of drying. The resulting dried pieces are shelf stable and capable of receiving extra seasoning compared to an unsliced dried piece.

All percentages refer to a percent by weight (wt. %) unless specifically noted otherwise and/or unless it is evident from the context (e.g., reference to a surface area).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following description accompanies the drawings, all given by way of non-limiting examples that may be useful to understand how the described seasoned sliced pretzel and process may be embodied.

DETAILED DESCRIPTION

The shaped snack product, for example a pretzel, formed according to the following description exhibits an aesthetically pleasing shape with a surface capable of receiving and retaining seasoning better than a traditional pretzel that has a relatively hard outer shell surrounding its entire surface area. The described process produces a shaped snack product having an optimized geometry and moisture content with an outer shell present only on a portion of the surface area of the shaped snack product. The shaped snack product includes a first portion covered by an outer shell and a second portion that is devoid of an outer shell and may be referred to as an exposed surface. The exposed surface is capable of receiving and retaining seasoning, and the seasoning remains in contact with (and is retained on) the exposed surface. Additionally, the shaped snack product is sufficiently robust to handle a seasoning tumbler and packaging without breaking. In one instance, the shaped snack product is formed by slicing. In some embodiments, a shaped snack product is made in a manner to optimize its geometry and to control the moisture content during intermediary processing steps to produce a shaped snack product having a substantially uniform thickness and an outer shell formed on a portion of the outer surface of the shaped snack product.

The snack product can be formed into many suitable shapes suitable to provide a snack product. While a traditional pretzel shape (twist-knot) is popular, the snack product is not limited to a particular shape such as a twist-knot-shaped pretzel. For example, the snack product may have the shape of a square, a circle, a triangle, a rectangle. The snack product may also be in the shape of letters, numbers, or cartoon characters. In one embodiment, the snack product is in the form of a pretzel and may, in some instances, be in the form of a traditional twisted (knot-shaped) pretzel shape. For ease of description, the following will describe the snack product as a pretzel with the understanding that, as noted above, the snack product may have any suitable shape. Further, and for ease of description, the pretzel will be described as having a shape similar to the traditional twisted (knot-shaped or Bavarian) pretzel shape, although as noted above the snack product may or may not be a pretzel as that term is generally known and may or may not have the traditional twisted (knot-shaped or Bavarian) shape.

As will be described in more detail, the exposed surface may result from slicing a snack product having an outer shell and specified moisture content. At least two intermediate pieces result from slicing, each having an outer shell and an exposed surface that is composed of the breaded inner core or "crumb." In some embodiments, the outer shell may include salt. In some embodiments, the outer shell may include toast marks. After slicing, the intermediate pieces are dried to a desired moisture content and, at this point, may be referred to as the pretzel.

The exposed surface may be substantially flat. The term "substantially flat" means any deviation in the evenness (smoothness) of the exposed surface is no more than 5%. The outer shell may not be flat and may include rounded edges.

Figure 5:
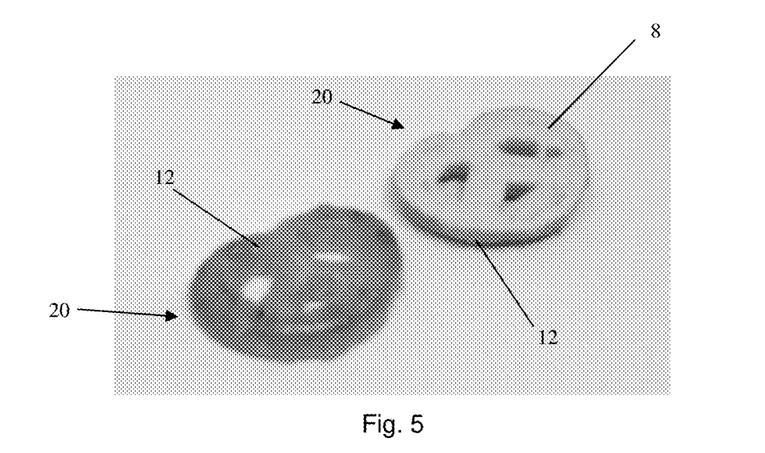
FIG. 5 is perspective view of a shaped snack according to the disclosure in the form of a pretzel and it illustrates the outer shell and exposed surface.

As shown in FIG. 5, the pretzel 20 has a total surface area that may be divided into a first portion 12 and a second portion 8. The first portion 12 is defined by an outer shell and the second portion 8 is devoid of an outer shell and can be defined as an exposed surface. The exposed surface resembles the baked inner core of a traditional, crunchy pretzel. The first and second portions may define a ratio of the surface area of the outer shell to the surface area of the exposed surface and the ratio may be about 1.5:1, about 1.4:1, about 1.3:1, about 1.2:1, about 1.1:1, about 1:1, about 0.9:1, about 0.8:1, about 0.7:1, about 0.6:1, about 0.5:1, about 0.4:1, about 0.3:1, about 0.2:1, about 0.1:1, or about 0.05:1.

Consistent with the above ratios, the outer shell of the pretzel may be a fraction (expressed as a percentage) of the surface area of the outer shell to the total surface area. Similarly, the surface area of the exposed surface may be a fraction (expressed as a percentage) of the surface area of the exposed surface to the total surface area. To this end, the percentage of the surface area of the outer shell to the total surface area of the intermediate piece may be between about 1% to about 65%, about 1% to about 60% about 1% to about 55%, about 1% to about 50%, about 1% to about 45%, about 1% to about 40%, about 1% to about 35%, about 1% to about 30%, about 1% to about 25%, about 1% to about 20%, about 1% to about 15%, about 1% to about 10%, about 1% to about 5%, about 5% to about 65%, about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15% or about 5% to about 10%. The percentage of the surface area of the outer shell to the total surface area of the intermediate piece may be about 1%, about 5%, about 10%, about 15%, about 20%, about 25%, about 30%, about 35%, about 40%, about 45%, about 50%, about 55%, about 60%, or about 65%.

The percentage of the surface area of the exposed surface to the total surface area may between about 35% to about 99%, about 40% about 99%, about 45% to about 99%, about 50% to about 99%, about 55% to about 99%, about 60% to about 99%, about 65% to about 99%, about 70% to about 99%, about 75% to about 99%, about 80% to about 99%, about 85% to about 99%, about 90% to about 99%, about 95% to about 99%, about 35% to about 95%, about 40% to about 95%, about 45% to about 95%, about 50% to about 95%, about 55% to about 95%, about 60% to about 95%, about 65% to about 95%, about 70% to about 95%, about 75% to about 95%, about 80% to about 95%, about 85% to about 95%, or about 90% to about 95%. The percentage of the surface area of the exposed surface to the total surface area may be about 35%, about 40%, about 45%, about 50%, about 55%, about 60%, about 65%, about 70%, about 75%, about 80%, about 85%, about 90%, about 95%, or about 99%.

A typical traditional crunchy pretzel has a moisture content ranging between 2.0% to 2.2%. In contrast, the described pretzel may have a moisture content from about 0.5% to about 3.75%. In some embodiments, the pretzel may have a moisture content from about 2.5% to about 3.7%, about 2.5% to about 3.6%, about 2.5% to about 3.5%, about 2.5% to about 3.4%, about 2.5% to about 3.3%, about 2.5% to about 3.2%, about 2.5% to about 3.1%, or about 2.5% to about 3%. The sliced pretzel may have a moisture content of about 2.5%, about 2.55%, about 2.6%, about 2.65%, about 2.7%, about 2.75%, about 2.8%, about 2.85%, about 2.9%, about 2.95%, about 3.0%, about 3.05%, about 3.1%, about 3.15%, about 3.2%, about 3.25%, about 3.3%, about 3.35%, about 3.4%, about 3.45%, about 3.5%, about 3.55%, about 3.6%, about 3.65%, about 3.7%, or about 3.75%.

When the seasoning applied to the pretzel is a water-based seasoning or applied using water, the overall moisture content the seasoned pretzel may be greater than a pretzel to which no water-based seasoning is applied. In those instances, when the applied seasoning is a water-based seasoning or the seasoning is applied using water, such a seasoned pretzel may have a moisture content from about 2.5% to about 5%, about 2.75% to about 5%, about 3% to about 5%, about 3.25% to about 5%, about 3.5% to about 5%, about 3.75% to about 5%, about 4% to about 5%, or about 4.5% to about 5%. In some embodiments, the pretzel including seasoning has a moisture content of about 2.5%, about 2.55%, about 2.6%, about 2.65%, about 2.7%, about 2.75%, about 2.8%, about 2.85%, about 2.9%, about 2.95%, about 3%, about 3.05%, about 3.1%, about 3.15%, about 3.2%, about 3.25%, about 3.3%, about 3.35%, about 3.4%, about 3.45%, about 3.5%, about 3.55%, about 3.6%, about 3.65%, about 3.7%, about 3.75%, about 3.8%, about 3.85%, about 3.9%, about 3.95%, about 4% about 4.05%, about 4.1%, about 4.15%, about 4.2%, about 4.25%, about 4.3%, about 4.35%, about 4.4%, about 4.45%, about 4.5%, about 4.55%, about 4.6%, about 4.65%, about 4.7%, about 4.75%, about 4.8%, about 4.85%, about 4.9%, about 4.95%, or about 5%.

In some embodiments, a pretzel that is seasoned with a dry or powdered seasoning or is seasoned with an oil-based seasoning or the seasoning is applied using oil, the seasoned pretzel may have a lower overall moisture content than a pretzel to which no seasoning has been applied.

As noted above, the pretzel may include seasoning (flavor). The type of seasoning and/or kind of seasoning is not limited. Non-limiting examples of seasoning that may be received and retained by the pretzel include sweet, sour, savory, salty, bitter, spicy, zesty, hot, or a combination of two or more of any of these. The state of the seasoning is not limited by this disclosure. To that end, the seasoning may be applied to the pretzel as a powder, by using a liquid such as an oil, which may be applied to the pretzel in any suitable manner such as, but not limited to, by a spray. For example, the seasoning may be a solid such as a powder, a liquid such as a seasoning dissolved in water or oil, or an intermediate phase such as syrup or oil. One or more dyes may be included in the seasoning to impart one or more colors where the seasoning is retained.

The seasoning may be applied to and retained on the exposed surface, the seasoning may be applied to and retained on both the exposed surface and the outer shell, or the seasoning may be applied to and retained on the outer shell. More than one seasoning may be applied to the pretzel. As a non-limiting example, the outer shell may include salt and both the outer shell and exposed surface may include a seasoning other than salt.

Because the exposed surface is devoid of an outer shell and has ridges and pores, retention of any applied seasoning may be improved, particularly when compared to the retention of applied seasoning on the outer shell. For example, a traditional crunchy pretzel may have a maximum of 5% of applied seasoning when the seasoning is applied with an oil spray. A traditional crunchy pretzel may have a maximum of about 6% to about 7% of seasoning when applied with water. In contrast, the disclosed pretzel may include seasoning, or be capable of receiving, up to 10% of seasoning of the pretzel. The amount of seasoning may be between about 0.5% to about 10%, about 0.5% to about 9.5%, about 0.5% to about 8%, or about 0.5% to about 7.5%. In some embodiments, the pretzel includes seasoning in an amount of about 5.5%, about 6%, about 6.5%, about 7%, about 7.5%, about 8%, about 8.5%, about 9%, about 9.5%, or about 10% of the pretzel. In some embodiments, the pretzel contains great than 5% seasoning.

Alternatively, the amount of seasoning may be measured by the amount of surface area of the pretzel covered by the applied seasoning. In this regard, the described pretzel is capable of retaining between more than 5% and up to about 100% of applied seasoning over the total surface area.

Those skilled in the art will appreciate that organoleptic properties and aesthetics will determine, in part, the amount of seasoning applied to the pretzel. For example, the pretzel may include seasoning in a range of about 5% to about 99%, about 5% to about 95%, about 5% to about 90%, about 5% to about 85%, about 5% to about 80%, about 5% to about 75%, about 5% to about 70%, about 5% to about 65%, about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15%, or about 5% to about 10% of the total surface area. In some embodiments, the amount of seasoning on a sliced pretzel is about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99% of the total surface area.

Figure 6:
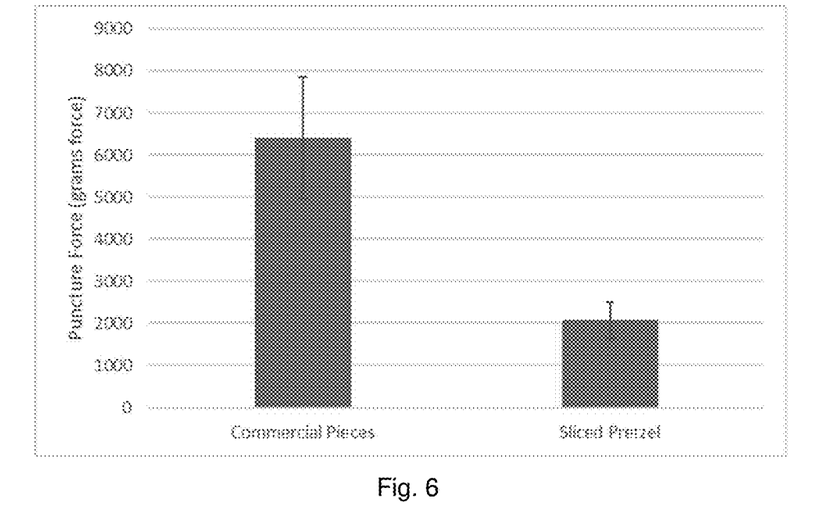
FIG. 6 is a graph comparing the hardness of the described sliced pretzel to a commercially available bits and pieces pretzel. The experiment controlled for the thickness of the samples by selecting pieces of similar size.

The described pretzel is designed to have a hardness to withstand packaging and impart satisfying organoleptic properties, such as crunch and melt. The sliced pretzel may have a puncture force hardness as measured by a texture analyzer of about 1500 grams force to about 3000 grams force, or about 2000 grams force. As shown in FIG. 6, the commercially available "bits and pieces" type product required a greater force to puncture compared to the described pretzel.

Processes for Making a Shaped Snack

Figure 1:
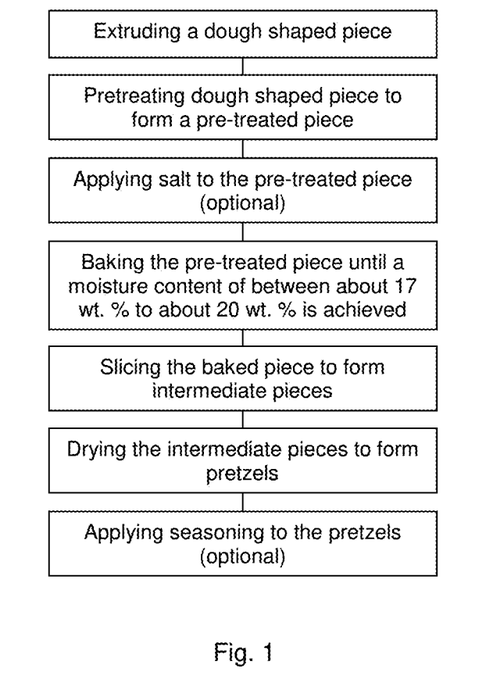
FIG. 1 is an illustrated schematic of one embodiment of a process to make a shaped snack.

A process for making a shaped snack is provided with intermediary steps to allow for slicing after an outer shell is formed. As noted above, while any shape of a snack product may be produced, the following will refer to a pretzel shape. Referring to FIG. 1, a schematic overview of a process to form the described pretzel is shown. The process includes extruding dough through a die shape into a shaped dough piece having a substantially uniform thickness. The shaped dough piece has a first surface and a second surface spaced from and generally parallel to the first surface to define the substantially uniform thickness. In some embodiments, the first and second surface are substantially flat. The term "substantially uniform thickness" means that any deviation in the thickness is no more than 5%. The substantially flat, uniform pieces impact the efficiency of the later step of slicing.

The dough used to form the shaped dough pieces may be any known dough used in the art of making snack products and/or pretzels. The dough may include seasoning. The shaped dough pieces have a moisture content from about 30% to about 40%, about 30% to about 39%, about 30% to about 38%, about 30 wt. % to about 37%, about 30% to about 36%, about 30% to about 35%, or about 32% to about 37%. In some embodiments, the shaped dough piece has a moisture content of about 35%. The shaped dough piece may have a moisture content of about 30%, about 31%, about 32%, about 33%, about 34%, about 35%, about 36%, about 37%, about 38%, about 39%, or about 40% by weight.

In illustrative embodiments, the shaped dough piece may have a substantially uniform thickness of about 0.05 inches to about 5 inch thick or in some instances may have a thickness of about 0.05 inches, about 0.1 inches, about 0.15 inches, about 0.2 inches, about 0.25 inches, about 0.3 inches, about 0.35 inches, about 0.4 inches, about 0.45 inches, about 0.5 inches, about 0.55 inches, about 0.6 inches, about 0.65 inches, about 0.7 inches, about 0.75 inches, about 0.8 inches, about 0.85 inches, about 0.9 inches, about 0.95 inches, about 1 inch, about 1.25 inches, about 1.5 inches, about 1.75 inches, about 2 inches, about 2.25 inches, about 2.5 inches, about 2.75 inches, about 3 inches, about 3.25 inches, about 3.5 inches, about 3.75 inches, about 4 inches, about 4.25 inches, about 4.5 inches, about 4.75 inches, or about 5 inches. In some embodiments, each shaped dough piece is formed from about 4 grams, about 4.5 grams, about 5 grams, about 5.5 grams, about 6 grams, about 6.5 grams, about 7 grams, about 7.5 grams, about 8 grams, about 8.5 grams, about 9 grams, about 9.5 grams, or about 10 grams of dough. For comparison, a traditional prior art crunchy pretzel is formed from about 2 to about 3 grams of raw dough.

Figure 7:
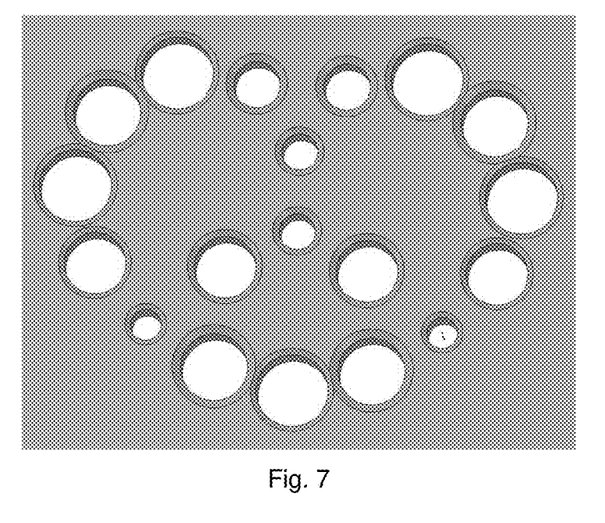
FIG. 7 is a schematic of a metering plate having engineered diameters to promote and/or restrict flow to certain areas within a die to produce the dough shaped piece shown in FIGS. 3a and 3b.

To extrude and form the dough into shaped dough pieces having a substantially uniform thickness, a modified die was designed and configured to produce individual dough pieces having a substantially uniform thickness. In an exemplary embodiment, a die was designed to form the dough shaped pieces having a uniform thickness. Referring to FIG. 7, the die may include a metering plate having engineered openings that promote or reduce the flow of dough as it passes from the die inlet to the die outlet. Design of the flow path leading up to the outlet may have an impact. Additionally, the modified die may be designed and formed to provide more even flow of the dough through the die, to reduce the amount of dough in certain locations, and to reduce or eliminate the nubs present in traditional prior art Bavarian style pretzels. As a result and in contrast to prior art Bavarian style pretzel having outer protrusions, the modified die may produce a substantially smooth uniform shape without nubs or peripheral protrusions.

Figure 2A:
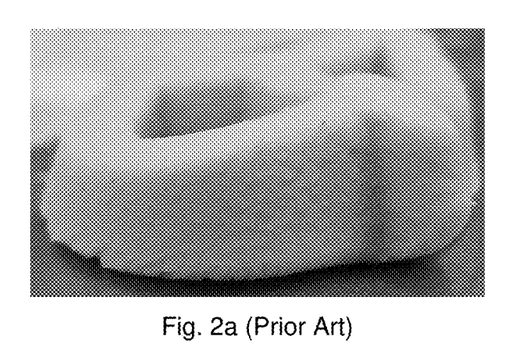
FIG. 2a shows a perspective view a prior art Bavarian style pretzel dough form that illustrates the uneven thickness of the dough, which results in an uneven thickness of the finished pretzel.
Figure 2B:
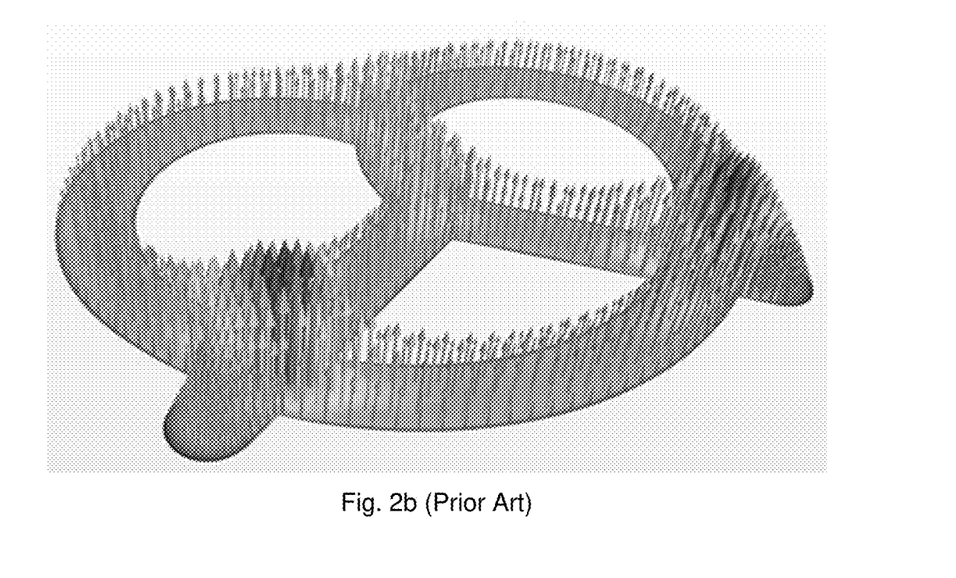
FIG. 2b shows the flow gradient of dough exiting a die in the shape of a typical prior art Bavarian style pretzel with the differing colors, lengths and thickness of the arrows indicating the variation in dough thickness exiting the die. In particular, the green, smaller and, narrower arrows indicate a "normal" or expected amount of dough and the red, taller, and thicker arrows indicate a greater amount of dough, which creates the typical "bumps" present in the typical prior art Bavarian style pretzel.

In this regard, FIG. 2b depicts the flow gradient of dough through a typical prior art die used to form a typical prior art Bavarian pretzel. As depicted, those areas shown in red, with taller and thicker arrows indicate the presence of the greatest amount of dough, with yellow depicting the next greatest amount, then green and finally blue, which depicts the least amount of dough. From FIG. 2b, it will be appreciated that the typical Bavarian pretzel includes two protrusions that extend outwardly from the periphery and which are a defining characteristic of the typical Bavarian pretzel. In addition, it will be appreciated that in those areas with the greatest amount of dough (shown in red) nubs will be created in the finished product on the top surface, which the skilled artisan will appreciate will produce a non-uniform thickness as shown in FIG. 2a.

Figure 3A:
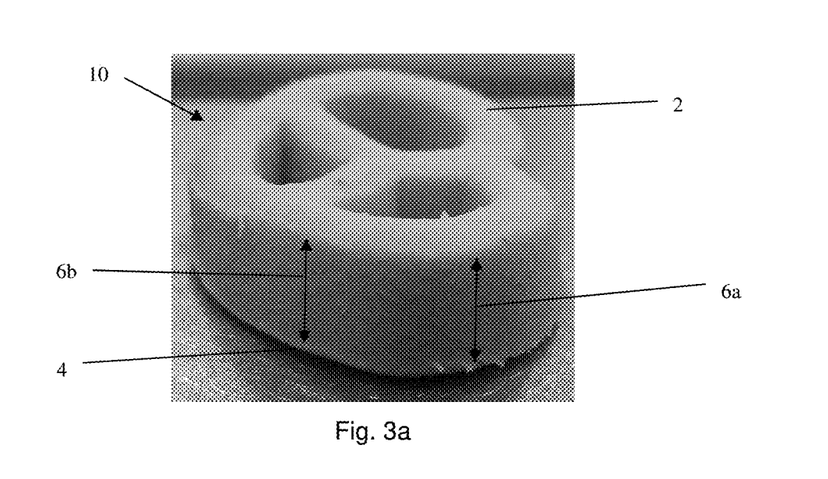
FIG. 3a shows a perspective view of a dough shaped piece according to this disclosure that illustrates the substantially uniform thickness of the dough.
Figure 3B:
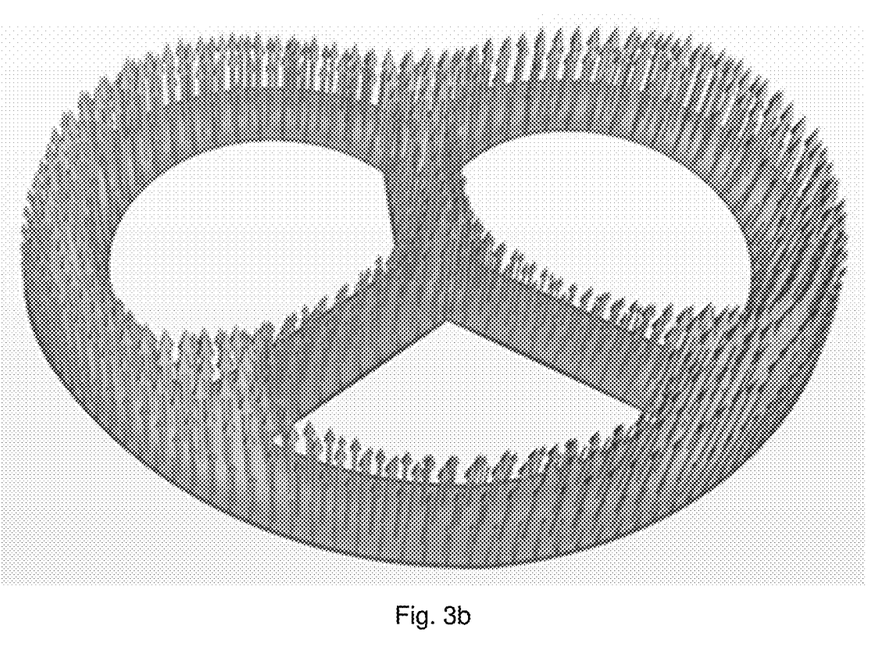
FIG. 3b shows the flow gradient of dough exiting a modified die used to create the described pretzel shaped snack with the substantially yellow and green colors indicating the substantially uniform thickness of the dough as the shaped dough exits the die.

On the other hand, FIG. 3b shows the flow gradient of dough through a modified die in which the characteristic nubs and outward protrusions in the periphery of the typical Bavarian pretzel will not be present. In particular, the modified die may be configured to more evenly distribute the flow of the dough through the die to reduce or eliminate areas of high concentration of dough, i.e., no areas shown in red. The skilled artisan will appreciate that, because the flow of dough through the die is more evenly distributed, the amount of dough forming the shaped dough product is more evenly distributed as compared to a typical Bavarian pretzel. As a result, the extruded shaped dough piece 10 will have a thickness (6a, 6b) between the top surface 2 and the bottom surface 4 that is substantially uniform as shown in FIG. 3a.

After formation of the shaped dough pieces, they may be pre-treated. For example, the shaped dough pieces may be pretreated by par-cooking or exposure to a caustic bath to form an outer shell. When pre-treating by exposure to a caustic bath, the shaped dough pieces may be completely submerged in a caustic bath to cause an outer shell to form around the entire outer surface of the shaped dough piece when exposed to heat. The disclosed method of making a pretzel is not limited by the parameters chosen for par-cooking or the caustic bath. Any known formulations and parameters used in the industry to form an outer shell are encompassed in this disclosure. The pre-treated piece may subsequently be salted or unsalted prior to baking.

After pre-treatment to form the outer shell, the pre-treated pieces are baked to form a baked piece having an outer shell and a moisture content of about 15% to about 21%, about 15% to about 20%, about 15% to about 19%, about 15% to about 18%, about 15% to about 17%, about 15% to about 16%, about 16% to about 21%, about 16% to about 20%, about 16% to about 19%, about 16% to about 18%, about 16% to about 17%, about 17% to about 21%, about 17% to about 20%, about 17% to about 19%, about 17% to about 18%, about 18% to about 21%, about 18% to about 20%, about 18% to about 19%, about 19% to about 21%, about 19% to about 20%, or about 20% to about 21%. In some embodiments, the baked piece has a moisture content of about 16%, about 16.5%, about 17%, about 17.5%, about 18%, about 18.5%, about 19%, about 19.5%, about 20%, about 20.5%, or about 21%. In an illustrative embodiment, the baked piece has a moisture content between 17% to about 20%, or about 18%. For comparison, the traditional crunchy pretzel snack has a post-baking moisture content of about 6% to about 8%. Without being limited by any particular theory, it is believed that the higher moisture content within the baked piece results in a fairly uniform slice resulting in two or more whole slices. In other words, there is very little breakage or cracking resulting from the slicing.

The pre-treated piece may be baked at temperatures and for a set amount of time until the moisture content is reduced from its initial moisture content to the moisture content ranges described above. Generally, lower temperature and longer time conditions provide for a higher moisture content, which may increase slicing efficiency. In some embodiments, the pre-treated piece may be baked at a temperature from about 425° F. to about 575° F., about 450° F. to about 575° F., about 475° F. to about 575° F., about 475° F. to about 525° F., about 500° F. to about 575° F., about 525° F. to about 575° F., about 525° F. to about 550° F., or about 550° F. to about 575° F. The baking temperature may be about 475° F., about 500° F., about 525° F., about 550° F., or about 575° F. For comparison, traditional prior art crunchy pretzels are baked at a temperature of about 575° F. to about 600° F.

While baking, the pre-treated pieces will have a dwell time that is sufficient to reduce the overall moisture content. The dwell time is affected by the baking temperature and the desired overall moisture content. As a non-limiting example, the dwell time may be from about 2 minutes to about 10 minutes, about 3 minutes to about 9 minutes, about 4 minutes to 9 minutes, about 5 minutes to about 10 minutes, about 6 minutes to about 8 minutes, or about 7 minutes. In some embodiments, the dwell time is about 2 minutes, about 3 minutes, about 4 minutes, about 5 minutes, about 6 minutes, about 7 minutes, about 8 minutes, about 9 minutes, or about 10 minutes. For comparison, traditional prior art crunchy pretzels are made with a dwell time of about 3 to about 4 minutes. In general in the disclosed process, the baking time is at a lower temperature for a longer time than a traditional crunchy pretzel in order to control the overall moisture content and texture of the baked piece. The disclosed process allows for slicing the piece after the outer shell has formed with reduced or no cracking and breaking.

Figure 4:
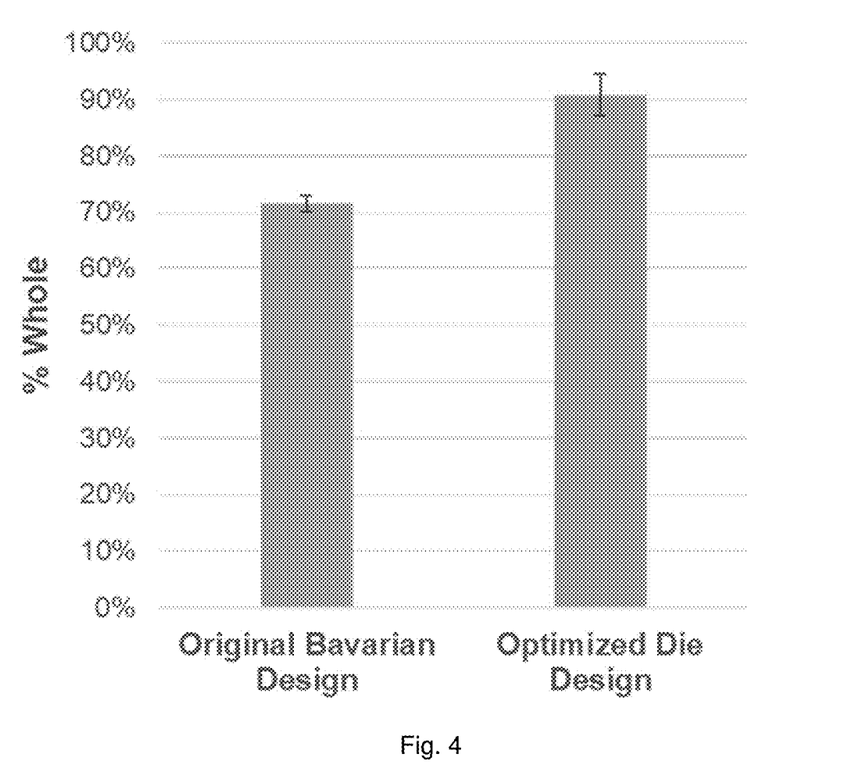
FIG. 4 is a graph that compares the amount of whole pieces remaining after slicing a typical prior art Bavarian style pretzel and a baked dough piece according to the present disclosure. It is evident that baked dough piece exhibited less breakage upon slicing than the typical Bavarian style pretzel.

After baking to form the outer shell and reducing the moisture content, the baked piece is sliced to form intermediate pieces such that each intermediate piece has a thickness less than the substantially uniform thickness. In one instance, the slice may traverse between the two substantially flat surfaces of the baked piece (i.e., between the top surface 2 and the bottom surface 4, as shown in FIG. 3a), resulting in at least two intermediate pieces 20, as shown in FIG. 5. In other words, the slice is about parallel to the two flat surfaces. The slice may traverse through about the center (mid-point) between the two flat surfaces. Once sliced, each intermediate piece 20 includes an outer shell portion 12 and an exposed surface portion 8 that is devoid of an outer shell, as shown in FIG. 5. As shown in FIG. 4, the disclosed process reduces the amount of breakage that occurs upon slicing, producing about 90% whole pieces compared to a traditional prior art Bavarian style baked pretzel of the same thickness but non-flat surfaces.

The intermediate piece may have an outer shell portion being about 1% to about 75% of a total surface area and an exposed surface portion being about 25% to about 95% of the total surface area of the intermediate piece. The percentage of the surface area of the outer shell to the total surface area of the intermediate piece may be between about 1% to about 75%, about 1% to about 70%, about 1% to about 65%, about 1% to about 60% about 1% to about 55%, about 1% to about 50%, about 1% to about 45%, about 1% to about 40%, about 1% to about 35%, about 1% to about 30%, about 1% to about 25%, about 1% to about 20%, about 1% to about 15%, about 1% to about 10%, about 1% to about 5%, about 5% to about 75%, about 5% to about 70%, about 5% to about 65%, about 5% to about 60%, about 5% to about 55%, about 5% to about 50%, about 5% to about 45%, about 5% to about 40%, about 5% to about 35%, about 5% to about 30%, about 5% to about 25%, about 5% to about 20%, about 5% to about 15% or about 5% to about 10%. The percentage of the surface area of the outer shell to the total surface area of the intermediate piece may be about 1%, about 5%, about 10%, about 15%, about 20%, about 25%, about 30%, about 35%, about 40%, about 45%, about 50%, about 55%, about 60%, about 65%, about 70%, or about 75%.

The percentage of the surface area of the exposed surface to the total surface area of the intermediate piece may between about 25% to about 99%, about 30% to about 99%, about 35% to about 99%, about 40% to about 99%, about 45% to about 99%, about 50% to about 99%, about 55% to about 99%, about 60% to about 99%, about 65% to about 99%, about 70% to about 99%, about 75% to about 99%, about 80% to about 99%, about 85% to about 99%, about 90% to about 99%, about 95% to about 99%, about 25% to about 95%, about 30% to about 95%, about 35% to about 95%, about 40% to about 95%, about 45% to about 95%, about 50% to about 95%, about 55% to about 95%, about 60% to about 95%, about 65% to about 95%, about 70% to about 95%, about 75% to about 95%, about 80% to about 95%, about 85% to about 95%, or about 90% to about 95%. The percentage of the surface area of the exposed surface to the total surface area of the intermediate piece may be about 25%, about 30%, about 35%, about 40%, about 45%, about 50%, about 55%, about 60%, about 65%, about 70%, about 75%, about 80%, about 85%, about 90%, about 95%, or about 99%.

In some embodiments, slicing results in at least two intermediate pieces. In other embodiments, the slicing may result in more than two intermediate pieces and in some instances may result in more than two intermediate pieces, for example three to ten intermediate pieces. In embodiments where a baked piece is sliced once, an intermediate piece may be stacked with one exposed surface abutting a corresponding respective exposed surface of another intermediate piece, the resulting shape resembles the shape of the baked piece. The exposed surface is substantially flat when the blade used in slicing is flat. Slicing may occur between the top surface and bottom surface. It is also contemplated that, in other instances, the slicing may occur in other directions.

Once sliced, the two or more intermediate pieces are dried to a second moisture content. Any known manner of drying may be used such as, but not limited to, a kiln or oven. Interestingly, the sliced surface may improve the drying efficiency of each intermediate piece. For example, it is believed that an unsliced pretzel having a moisture content of about 18% would be difficult to dry to a finished moisture content between about 2% to about 4%. In contrast, the intermediate pieces may be dried to a second moisture content of about 0.5%, about 1%, about 1.5%, about 2%, about 2.5% to about 3.5%, about 2.5% to about 3.25%, about 2.5% to about 3%, about 2.5% to about 2.75%, about 2.75% to about 3.5%, about 2.75% to about 3.25%, about 2.75% to about 3%, about 3% to about 3.25%, about 3% to about 3.5%, or about 3.25% to about 3.5%. In some embodiments, the moisture content of the dried piece is about 2.75% to about 3.25%, or about 3%.

Once dried, seasoning may be applied to the pretzel. The seasoning may be applied using any suitable means and, in some instances, the seasoning is applied to the dried intermediate pieces using a tumbler. The amount of seasoning applied may be based on the desired taste and texture, as noted above. The type and/or kind of seasoning is not limited. Non-limiting examples of seasoning that may be applied to and retained by the pretzel include sweet, sour, savory, salty, bitter, spicy, zesty, hot, or a combination of two or more of any of these. The state of the seasoning is not limited by this disclosure. For example, the seasoning may be a solid such as a powder, a liquid such as a seasoning dissolved in water or oil, or an intermediate phase such as syrup or oil. One or more dyes may be included in the seasoning to impart one or more colors where the seasoning is retained.

The seasoning may be applied to and retained on the exposed surface, the seasoning may be applied to and retained on both the exposed surface on the outer shell, or the seasoning may be applied to and retained on the outer shell. More than one seasoning may be applied to the seasoned pretzel. As a non-limiting example, the outer shell may include salt and the both the outer shell and exposed surface may include a seasoning other than salt.

In an illustrative embodiment, a knot-shaped pretzel having a top, bottom, arms, and body may be formed by extruding a dough having a moisture content between about 30% and about 40% through a die to form a knot-shaped dough piece having a substantially uniform thickness. The shaped dough piece may be exposed to a caustic bath to form an outer shell. Salt may be added to the surfaces exposed to the caustic bath. Next, the dough piece is baked until the moisture content of the dough piece is within a target moisture content of about 16% to about 21%. Once the dough piece is at the targeted moisture content, the dough piece may be sliced to form sliced intermediate pieces. In some embodiments, each sliced intermediate piece has a thickness less than the uniform thickness. Once sliced, the intermediate pieces may be dried until they reach a second target moisture content of about 2.5% to about 3.5% to form a dried piece also referred to as a pretzel. A seasoning may be applied to the pretzel in any suitable manner such as by a tumbler.

The substantially uniform thickness of the knot-shaped pretzel is formed from a first side spaced from a second side to define the thickness. In some embodiments, the knot-shaped dough further comprises an outer periphery being free of protrusions.

In some embodiments, the shaped snack (e.g., pretzels) are packaged in a container such that all shaped snacks are of similar size and similar thickness. The shaped snacks may or may not include seasoning and, it is contemplated that the container may include more than one seasoning. It is also envisioned that the shaped snacks may be capable of receiving a dip or sauce. In some embodiments, the shaped snacks may be provided as a first pretzel having an exposed surface abutting an exposed surface of a second pretzel, and a spread, sauce, seasoning, or dip extending between and contacting the first exposed surface of the first pretzel and the exposed surface of the second pretzel.

Examples and Methodology

A prior art traditional crunchy pretzel was compared to a pretzel made according to the described method, at each step of the disclosed process.

The prior art traditional crunchy pretzel and the pretzel made according to the described method were formed from identical ingredients. As shown below in Table 1, the disclosed pretzel was formed using more dough per dough shaped piece to provide a greater surface area for slicing. An industry standard die for forming the prior art traditional Bavarian pretzel shape was used to form the prior art traditional crunchy pretzel with periphery protrusions and a non-uniform thickness. A modified die, as described above with reference to FIG. 3a, FIG. 3b, and FIG. 7, was used to produce the smooth, and flat shaped dough pieces.

TABLE 1

| | Parameter | Traditional | Pretzel |
|---|---|---|---|
| Extruding, forming, & cutting to form shaped dough pieces | Raw weight per piece of dough (g) | ~2.4 | ~7 |
| Outer Shell formation | | Caustic bath | |
| Baking | Oven temp. (° F.) | 575 or 600 | 475, 525, or 575 |
| | Dwell (min) | 3-4 | 6-8 |
| | Exit moisture (%) | 7-8 | 17-20 |
| Slicing | | None | Sliced |
| Drying | Initial moisture (%) | 7-8 | 17-20 |
| | Final moisture (%) | 2-2.5 | 2.75-3.25 |

It will be appreciated that the uniform thickness of the shaped dough pieces formed with smooth sides and flat surfaces increased the ability to slice the baked pretzel into two fairly even intermediate pieces. When a prior art traditional Bavarian style pretzel, having an uneven thickness, was produced, the slicing was angled, off-center, and resulted in about 30% broken and/or chipped intermediate pieces. Additionally, it was found that the post-baked moisture content of the described pretzel improved the slicing efficiency and ability to slice the pretzel. Outside of the identified range of 17-20% moisture content, or around 18%, the slicing did not work as well. For instance, when the moisture content is below about 16%, the baked piece was found to be too hard and broke apart or chipped, when sliced. When the moisture content is above about 21% the baked piece was found to be too soft to achieve a clean cut and instead resulted in deformed intermediate pieces.

The substantially uniform thickness of the dough shaped pieces impacted the slicing and ability to achieve a substantially flat exposed surface. In this regard, an experiment was conducted to evaluate the initial thickness after baking in comparison to the thickness after slicing. The thickness after baking ranged from about 0.4 inches to about 0.5 inches with an average of 0.467 inches. After slicing, the thickness of the intermediate pieces ranged from about 0.15 inches to about 0.3 inches with an average of 0.228 inches.

While there are snack food items such as commercially available bits-and-pieces-type of pretzel that have an exposed core and partial outer shell, these snack food items are not uniform and they have a different texture compared to the described pretzel. To demonstrate the difference in texture between the two, an XT2 analyzer with a pointed tip was used to measure the force required to drive the tip into each sample a distance of about 5 mm. The experiment controlled for thickness of the samples by selecting or preparing the commercial product to have a similar thickness. As shown in FIG. 6, the commercially available bits and pieces-type pretzel product is substantially harder than the described pretzels (i.e., the sliced pretzels). The analyzer measured a force of about 1,450 grams force to about 3,000 grams force to drive the tip 5 mm into the pretzel. In contrast, the analyzer measured between about 5,000 grams force and 8,000 grams force was required to drive the tip 5 mm into the commercially available bits-and-pieces-style pretzel 5 mm.

The ability of the pretzel to retain applied seasoning was also tested. Experiments were conducted to compare seasoning retention to a traditional pretzel, as well as, a comparison of the outer shell to the exposed surface of the sliced pretzels. In experiments using an oil spray and seasoning mixture, the traditional pretzel retained a maximum amount of 5% of seasoning. In contrast, the pretzels retained greater than 5% in seasoning even upwards of about 7% to about 9%. A second analysis was conducted comparing unsliced pretzels to sliced pretzels. Generally, when higher amounts of seasoning were applied with an oil spray (e.g., greater than 10%) the exposed surface was capable of capturing and retaining more seasoning than the unsliced pretzel.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims. Although this disclosure refers to specific embodiments, it will be understood by those skilled in the art that various changes in form and detail may be made without departing from the subject matter set forth in the accompanying claims.

The invention claimed is:

1. A process comprising:
   extruding dough into a shaped dough piece having a top surface opposed to a bottom surface to define a substantially uniform thickness between the top surface and the bottom surface;
   pretreating the shaped dough piece to form a pre-treated piece;
   baking the pre-treated piece to form a baked piece encapsulated by an outer shell and having a moisture content of about 16.5 wt. % to about 21 wt. %;
   slicing the baked piece in a direction parallel to the top and bottom surfaces to form sliced intermediate pieces, each sliced intermediate piece having a thickness less than the substantially uniform thickness; and drying the intermediate pieces to form shaped snacks.

2. The process of claim 1, further comprising, after drying, applying seasoning to the shaped snacks.

3. The process of claim 2 wherein the seasoning is applied to each shaped snack in an amount greater than 5 wt. % of a total weight for each shaped snack.

4. The process of claim 1, wherein the top and bottom surfaces are substantially flat.

5. The process of claim 1, wherein the pretreating is selected from par-cooking or a caustic bath.

6. The process of claim 1, wherein slicing results in at least three sliced intermediate pieces.

7. The process of claim 1, wherein the outer shell of each sliced intermediate piece covers about 5% to about 65% of a total surface area of each sliced intermediate piece.

8. The process of claim 1, wherein each sliced intermediate piece has an exposed surface in the range of about 35% to about 95% of a total surface area of each sliced intermediate piece.

9. The process of claim 1, wherein about 10% or less breakage occurs during slicing.

10. The process of claim 1, wherein each shaped snack has a first surface with an outer shell and a second surface opposite the first surface and being devoid of an outer shell.

\* \* \* \* \*